(12) United States Patent  (10) Patent No.: US 8,204,628 B2
Schnell et al.  (45) Date of Patent: Jun. 19, 2012

(54) SETPOINT RECOVERY WITH UTILITY TIME OF DAY PRICING

(75) Inventors: Robert J. Schnell, Plymouth, MN (US); Peter Joseph Erickson, Crystal, MN (US); Michael Lunacek, Rogers, MN (US)

(73) Assignee: Honeywell International Inc., Morristown, NJ (US)

( * ) Notice: Subject to any disclaimer, the term of this patent is extended or adjusted under 35 U.S.C. 154(b) by 239 days.

(21) Appl. No.: 12/731,040

(22) Filed: Mar. 24, 2010

(65) Prior Publication Data

US 2011/0238224 A1 Sep. 29, 2011

(51) Int. Cl.
G05B 21/00 (2006.01)
G05B 13/00 (2006.01)
G05B 15/00 (2006.01)
G01M 1/38 (2006.01)
G05D 23/00 (2006.01)
G05D 23/12 (2006.01)
G05D 23/185 (2006.01)
G05D 23/19 (2006.01)
G01R 11/56 (2006.01)
G01R 21/133 (2006.01)
G06F 17/00 (2006.01)
F24F 11/053 (2006.01)

(52) U.S. Cl. ....... 700/278; 705/412; 236/1 C; 236/91 D; 165/239

(58) Field of Classification Search .................. 700/275, 700/276, 278; 705/400, 412; 236/1 R, 1 C, 236/47, 91 R, 91 D; 165/200, 201, 237–239
See application file for complete search history.

(56) References Cited

U.S. PATENT DOCUMENTS 4,216,384 A 8/1980 Hurley
4,228,511 A 10/1980 Simcoe et al.
4,337,401 A 6/1982 Olson
4,341,345 A 7/1982 Hammer et al.
4,345,162 A 8/1982 Hammer et al.
(Continued)

FOREIGN PATENT DOCUMENTS

EP 0735516 6/2004
(Continued)

OTHER PUBLICATIONS http://www.comfortchoice.carrier.com/details_printable, "EMi—Carrier's Internet Communicating Programmable Thermostat," 1 page, printed May 22, 2007.
(Continued)

Primary Examiner — Crystal J Barnes-Bullock
(74) Attorney, Agent, or Firm — Seager Tufte & Wickhem LLC

(57) ABSTRACT

An HVAC controller with setpoint recovery with utility time of day pricing. In one illustrative embodiment, the HVAC controller may include a nominal programmable schedule and a utility pricing schedule. The utility pricing schedule may correspond to scheduled price changes of a utility, including one or more enhanced pricing time periods each having corresponding one or more enhanced pricing time period setpoints. The HVAC controller may establish or modify an enhanced pricing setpoint recovery schedule based at least in part upon the nominal schedule and the utility pricing schedule, and may control one or more HVAC units in accordance with the setpoint recovery schedule. In some instances, the HVAC controller may identify recovery opportunities based at least in part upon the nominal schedule and the utility pricing schedule.

20 Claims, 9 Drawing Sheets

U.S. PATENT DOCUMENTS

| | | |
|---|---|---|
| 4,382,544 A | 5/1983 | Stewart |
| 4,401,262 A | 8/1983 | Adams et al. |
| 4,509,585 A | 4/1985 | Carney et al. |
| 4,583,182 A | 4/1986 | Breddan |
| 4,657,179 A | 4/1987 | Aggers et al. |
| 4,702,413 A | 10/1987 | Beckey et al. |
| 4,706,882 A | 11/1987 | Barnard |
| 4,764,766 A | 8/1988 | Aoyama et al. |
| 4,828,016 A | 5/1989 | Brown et al. |
| 4,839,636 A | 6/1989 | Zeiss |
| 4,911,358 A | 3/1990 | Mehta |
| 4,991,770 A | 2/1991 | Bird et al. |
| 5,025,984 A | 6/1991 | Bird et al. |
| 5,218,399 A | 6/1993 | Izumi et al. |
| 5,219,119 A | 6/1993 | Kasper et al. |
| 5,244,146 A | 9/1993 | Jefferson et al. |
| 5,270,952 A | 12/1993 | Adams et al. |
| 5,289,362 A | 2/1994 | Liebl et al. |
| 5,314,004 A | 5/1994 | Strand et al. |
| 5,395,042 A | 3/1995 | Riley et al. |
| 5,454,511 A | 10/1995 | Van Ostrand et al. |
| 5,459,374 A | 10/1995 | Thoeny et al. |
| 5,462,225 A | 10/1995 | Massara et al. |
| 5,482,209 A | 1/1996 | Cochran et al. |
| 5,539,633 A | 7/1996 | Hildebrand et al. |
| 5,555,927 A | 9/1996 | Shah |
| 5,572,438 A | 11/1996 | Ehlers et al. |
| 5,598,349 A | 1/1997 | Elliason et al. |
| 5,622,310 A | 4/1997 | Meyer |
| 5,644,173 A | 7/1997 | Elliason et al. |
| 5,729,474 A | 3/1998 | Hildebrand et al. |
| 5,816,491 A | 10/1998 | Berkeley et al. |
| 5,822,997 A | 10/1998 | Atterbury |
| 5,833,134 A | 11/1998 | Ho et al. |
| 5,884,248 A | 3/1999 | Hall |
| 5,903,327 A | 5/1999 | Hijii |
| 5,924,486 A * | 7/1999 | Ehlers et al. ............... 165/238 |
| 5,926,776 A | 7/1999 | Glorioso et al. |
| 6,104,399 A | 8/2000 | Volkel |
| 6,122,603 A | 9/2000 | Budike, Jr. |
| 6,152,375 A | 11/2000 | Robison |
| 6,167,389 A | 12/2000 | Davis et al. |
| 6,216,956 B1 * | 4/2001 | Ehlers et al. ............... 236/47 |
| 6,236,443 B1 | 5/2001 | Carlsen |
| 6,254,009 B1 | 7/2001 | Proffitt et al. |
| 6,260,765 B1 | 7/2001 | Natale et al. |
| 6,264,110 B1 | 7/2001 | Proffitt et al. |
| 6,305,611 B1 | 10/2001 | Proffitt et al. |
| 6,311,105 B1 | 10/2001 | Budike, Jr. |
| 6,437,692 B1 | 8/2002 | Petite et al. |
| 6,478,233 B1 | 11/2002 | Shah |
| 6,480,803 B1 | 11/2002 | Pierret et al. |
| 6,496,168 B1 | 12/2002 | Tomida |
| 6,502,758 B2 | 1/2003 | Cottrell |
| 6,519,509 B1 | 2/2003 | Nierlich et al. |
| 6,549,870 B2 | 4/2003 | Proffitt et al. |
| 6,574,581 B1 | 6/2003 | Bohrer et al. |
| 6,619,555 B2 | 9/2003 | Rosen |
| 6,622,925 B2 | 9/2003 | Carner et al. |
| 6,634,566 B2 | 10/2003 | Archacki, Jr. et al. |
| 6,643,567 B2 | 11/2003 | Kolk et al. |
| 6,671,586 B2 | 12/2003 | Davis et al. |
| 6,681,154 B2 | 1/2004 | Nierlich et al. |
| 6,741,915 B2 | 5/2004 | Poth |
| 6,785,630 B2 | 8/2004 | Kolk et al. |
| 6,786,421 B2 | 9/2004 | Rosen |
| 6,789,739 B2 | 9/2004 | Rosen |
| 6,862,498 B2 | 3/2005 | Davis et al. |
| 6,868,293 B1 | 3/2005 | Schurr et al. |
| 6,879,806 B2 | 4/2005 | Shorty |
| 6,904,385 B1 | 6/2005 | Budike, Jr. |
| 6,931,445 B2 | 8/2005 | Davis |
| 6,975,958 B2 | 12/2005 | Bohrer et al. |
| 6,980,080 B2 | 12/2005 | Christensen et al. |
| 6,988,671 B2 | 1/2006 | DeLuca |
| 6,993,417 B2 | 1/2006 | Osann, Jr. |
| 7,000,849 B2 | 2/2006 | Ashworth et al. |
| 7,010,363 B2 | 3/2006 | Donnelly et al. |
| 7,039,532 B2 | 5/2006 | Hunter |
| 7,049,976 B2 | 5/2006 | Hunt et al. |
| 7,053,767 B2 | 5/2006 | Petite et al. |
| 7,103,511 B2 | 9/2006 | Petite |
| 7,130,719 B2 | 10/2006 | Ehlers et al. |
| 7,133,414 B2 | 11/2006 | Archacki, Jr. |
| 7,172,132 B2 | 2/2007 | Proffitt et al. |
| 7,184,861 B2 | 2/2007 | Petite |
| 7,225,171 B2 * | 5/2007 | Kikuchi et al. ............... 705/412 |
| 7,230,544 B2 | 6/2007 | Van Heteren |
| 7,279,659 B2 | 10/2007 | Gagas et al. |
| 7,346,467 B2 | 3/2008 | Bohrer et al. |
| 7,364,093 B2 | 4/2008 | Garozzo |
| 7,420,293 B2 | 9/2008 | Donnelly et al. |
| 7,434,742 B2 | 10/2008 | Mueller et al. |
| 7,516,106 B2 * | 4/2009 | Ehlers et al. ............... 705/412 |
| 7,949,615 B2 * | 5/2011 | Ehlers et al. ............... 705/412 |
| 2001/0010032 A1 | 7/2001 | Ehlers et al. |
| 2004/0034484 A1 | 2/2004 | Solomita, Jr. et al. |
| 2004/0260411 A1 | 12/2004 | Cannon |
| 2005/0040943 A1 | 2/2005 | Winick |
| 2005/0119766 A1 | 6/2005 | Amundson et al. |
| 2005/0194456 A1 | 9/2005 | Tessier et al. |
| 2005/0195757 A1 | 9/2005 | Kidder et al. |
| 2006/0049694 A1 | 3/2006 | Kates |
| 2007/0165835 A1 | 7/2007 | Berkman |
| 2007/0239317 A1 | 10/2007 | Bogolea et al. |
| 2008/0011864 A1 | 1/2008 | Tessier et al. |
| 2008/0122585 A1 | 5/2008 | Castaldo et al. |
| 2008/0177678 A1 | 7/2008 | Di Martini et al. |
| 2008/0262979 A1 | 10/2008 | Metcalfe |
| 2008/0272934 A1 | 11/2008 | Wang et al. |
| 2009/0001180 A1 | 1/2009 | Siddaramanna et al. |
| 2009/0001181 A1 | 1/2009 | Siddaramanna et al. |
| 2009/0077397 A1 | 3/2009 | Shnekendorf et al. |
| 2009/0187499 A1 | 7/2009 | Mulder et al. |
| 2009/0198384 A1 | 8/2009 | Ahn |
| 2009/0295594 A1 | 12/2009 | Yoon |
| 2009/0302994 A1 | 12/2009 | Rhee et al. |
| 2009/0302996 A1 | 12/2009 | Rhee et al. |
| 2009/0305644 A1 | 12/2009 | Rhee et al. |
| 2010/0070101 A1 | 3/2010 | Benes et al. |
| 2010/0094737 A1 | 4/2010 | Lambird et al. |
| 2010/0243231 A1 * | 9/2010 | Rosen ............... 165/237 |

FOREIGN PATENT DOCUMENTS

| | | |
|---|---|---|
| GB | 2333494 | 1/1998 |
| WO | 8501851 | 4/1985 |
| WO | 9621264 | 7/1996 |
| WO | 9808179 | 2/1998 |
| WO | 0152478 | 7/2001 |
| WO | 03032103 | 4/2003 |
| WO | 03084022 | 10/2003 |
| WO | 2006096854 | 9/2006 |

OTHER PUBLICATIONS http://www.comfortchoice.carrier.com/details_printable, "Carrier How Does it Work?", 1 page, printed May 22, 2007.

http://www.comfortchoice.carrier.com/details_printable, "Carrier System Elements and Hardware," 1 page, printed May 22, 2007.

http://lwww.comverge.com/printer.cfm, "Maingate Home," 1 page, printed May 22, 2007.

http://www.lightstat.com/products/utility.asp, "Lightstat Products for Utility Demand Response and Load Curtailment Programs," 2 pages, printed May 22, 2007.

http://www.smarthome.com13020t.html, "Aprilaire Communicating Thermostat," 4 pages, printed May 16, 2007.

Carrier ComfortChoice "Verifiable Demand Response, Two-Way Communicating Thermostat," 4 pages, 2007.

Carrier ComfortChoice, Web Interface, User Guide, pp. 1-6, Jan. 2002.

Central and Southwest Communications, Customer Choice and Control Thermostat Touchpad, User Guide, 18 pages, May 1996.

Comverge, Inc., "Adaptive Algorithms Yield Greater Performance," 2 pages, prior to Jun. 28, 2007.

Comverge, Inc., "SuperStat Thermostat Family," 2 pages, prior to Jun. 28, 2007.

Federal Energy Regulatory Commission, "Assessment of Demand Response & Advanced Metering, Staff Report," 228 pages, Aug. 2006.

Honeywell, R4525A Load Relay Module, Installation Instructions, 4 pages, 1995.

Honeywell, Programmable Load Controller Weekday/Weekend (5-day/Saturday/Sunday) Programmable Heat and/or Cool Conventional and Heat Pump T7512A,B,C, User's Guide, 32 pages, 1996.

Honeywell Cannon Technologies Alliance, T7512A,B Programmable Load Management Thermostat, Installation Instructions, 8 pages, 2002.

Honeywell Cannon Technologies Alliance, Programmable Load Management Thermostat Weekday/Weekend (5-day/Saturday/Sunday) T7512A,B, User's Guide, 32 pages, 2002.

Honeywell, T7512A,B,C,D Programmable Load Controller, Installation Instructions, 8 pages, 1997.

Honeywell, T7525117526 Thermostat Touchpad, User Guide, 16 pages, 1995.

Honeywell, "TotalHome Energy Management System 2000," 12 pages, 1995.

Honeywell, TotalHome Energy Management System 2000, Specification Data, 2 pages, 1996.

Honeywell, W8525A,B,C,D Control Module, Installation Instructions, 8 pages, 1995.

i-Stat, Installation and Operation Manual, for Low Voltage (24VAC) Systems Only, 14 pages, Nov. 2002.

LightStat, "Model RTPstat Thermostat," 2 pages, prior to Jun. 28, 2007.

Lightstat, "Virtual Gateway," 2 pages, prior to Jun. 28, 2007.

Honeywell, CM907 Programmable Thermostat, Product Specification Sheet, 7 pages, Sep. 2006.

U.S. Appl. No. 60/368,963, 202 pages, filed Mar. 28, 2002.

U.S. Appl. No. 60/383,027, 26 pages, filed May 24, 2002.

LuxPro, PSD122E Everything 'Stat, 2 pages, prior to Jun. 28, 2007.

LuxPro, PSP722E Everything 'Stat, 2 pages, prior to Jun. 28, 2007.

PSD122E, Installation and Operating Instructions, 6 pages, prior to Jun. 28, 2007.

PSP722E, Installation and Operating Instructions, 8 pages, prior to Jun. 28, 2007.

* cited by examiner

SETPOINT RECOVERY WITH UTILITY TIME OF DAY PRICING

TECHNICAL FIELD

The disclosure pertains generally to HVAC control, and more particularly, to HVAC control with utility time of day pricing support.

BACKGROUND

Heating, ventilation, and/or air conditioning (HVAC) systems are often used to control the comfort level within a building or other structure. Many HVAC systems include a controller that activates and deactivates one or more HVAC units or components of the HVAC system to affect and control one or more environmental conditions within the building. These environmental conditions can include, but are not limited to, temperature, humidity, and/or ventilation. In many cases, such an HVAC controller may include, or have access to, one or more sensors, and may use parameters provided by the one or more sensors to control the one or more HVAC components to achieve desired programmed or set environmental conditions.

An HVAC controller may be equipped with a user interface that allows a user to monitor and adjust the environmental conditions at one or more locations within the building. With more modern designs, the interface typically includes a display panel, such as a liquid crystal display panel, inset within a housing that contains a microprocessor as well as other components of the HVAC controller. In some designs, the user interface may permit the user to program the controller to activate on a certain schedule determined by the user. For example, the interface may include a routine that permits the user to change the temperature at one or more times during a particular day and/or group of days. Such a programmable schedule may help reduce energy consumption of the HVAC system by changing the setpoint to an energy saving set back temperature during certain times, such as when the building or space is expected to be unoccupied or when the occupants are expected to be sleeping.

When a programmable schedule is employed, and because it is not physically possible to warm up or cool down the space instantaneously to match the programmable schedule, the HVAC controller may be configured to command the HVAC unit(s) (furnace. air conditioner, etc.) to begin changing space temperature well before a scheduled set point change. For example, if an upcoming setpoint is scheduled to change from 68 degrees to 72 degrees at 6:00 AM, the HVAC controller may activate a furnace or the like at 5:30 AM so that the temperature in the building reaches the desired setpoint of 72 degrees at about the desired setpoint time of 6:00 AM. This is often referred to as "recovery" or "setpoint recovery".

Energy is supplied to most HVAC systems by one or more utilities, such as an electric utility and/or a gas utility. During peak demand periods, such as during hot summer days, such utilities may vary the rates that they charge for energy. Customers may wish to modify their energy consumption in response to these varying rates in order to reduce their energy bills. What would be desirable is a new HVAC controller and control methods that can help customers modify their energy consumption during peak or anticipated peak demand periods in concert with other HVAC system control objectives.

SUMMARY

The disclosure relates generally to Heating, Ventilation, and Air Conditioning (HVAC) control, and more particularly, to HVAC control with utility time of day pricing support. In one illustrative embodiment, an HVAC controller may include a nominal schedule that includes, for example, a number of days and one or more time periods for each of at least some of the days, as well as at least one setpoint associated with each of the one or more time periods. The HVAC controller may also include a utility pricing schedule that corresponds to scheduled price changes of a utility, including one or more enhanced pricing time periods each having corresponding one or more enhanced pricing time period setpoints. The HVAC controller may establishing or modifying an enhanced pricing setpoint recovery schedule based at least in part upon the nominal schedule and the utility pricing schedule, and may control the one or more HVAC units in accordance with the setpoint recovery schedule. In some instances, the HVAC controller may identify recovery opportunities based at least in part upon the nominal schedule and the utility pricing schedule.

The above summary is not intended to describe each and every disclosed illustrative example or every implementation of the disclosure. The Description that follows more particularly exemplifies various illustrative embodiments.

BRIEF DESCRIPTION OF THE FIGURES

The following description should be read with reference to the drawings. The drawings, which are not necessarily to scale, depict selected illustrative embodiments and are not intended to limit the scope of the disclosure. The disclosure may be more completely understood in consideration of the following description of various illustrative embodiments in connection with the accompanying drawings, in which.

DESCRIPTION

The following description should be read with reference to the drawings, in which like elements in different drawings are numbered in like fashion. The drawings, which are not necessarily to scale, depict selected illustrative embodiments and are not intended to limit the scope of the invention. Although examples of construction, dimensions, and materials are illustrated for the various elements, those skilled in the art will recognize that many of the examples provided have suitable alternatives that may be utilized.

Figure 1:
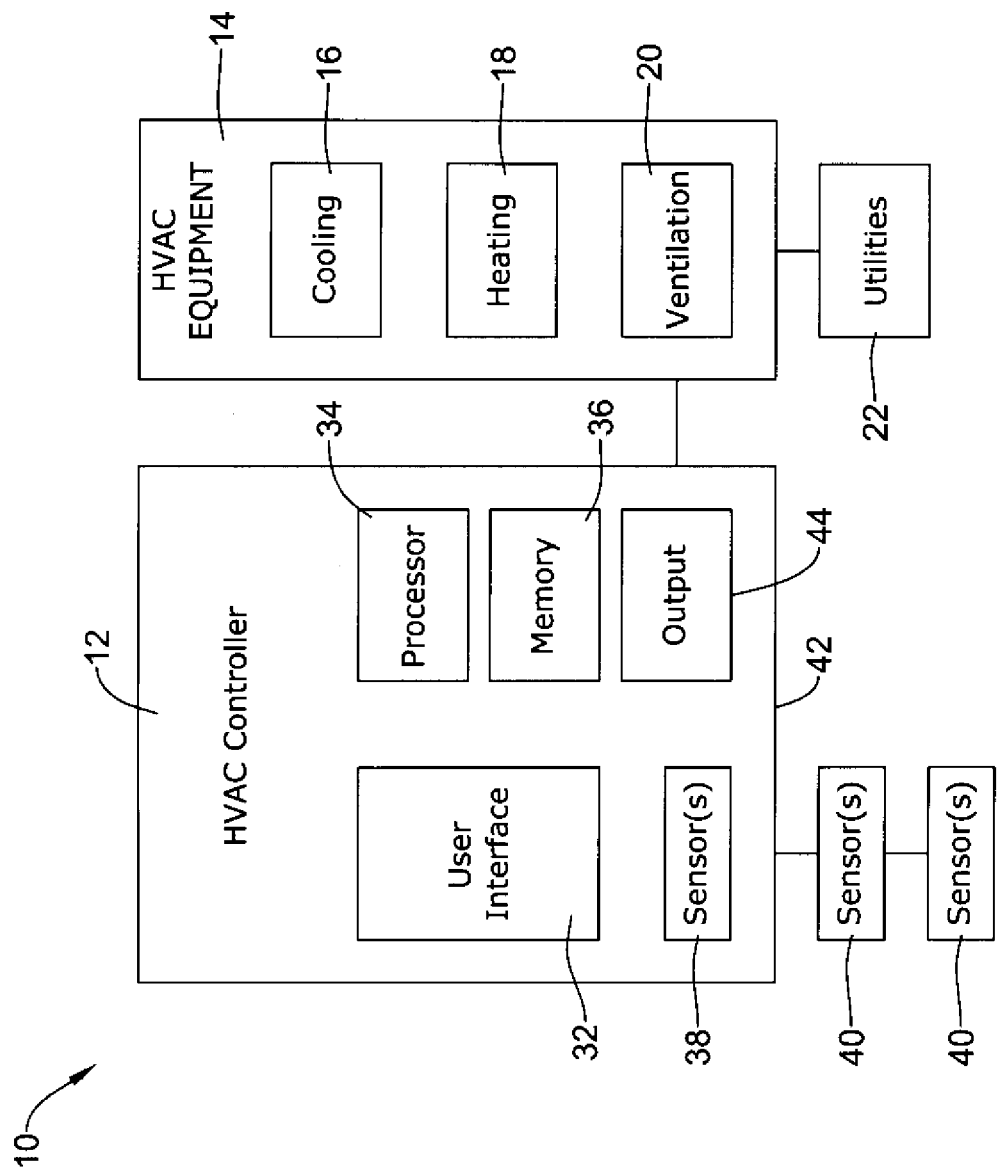
FIG. 1 is a schematic block diagram showing an illustrative HVAC system 10 for conditioning the inside air of a building.

FIG. 1 is a schematic diagram showing an illustrative HVAC system 10 for conditioning the inside air of a building. The methods and devices of the present disclosure may be practiced with HVAC system 10 and/or as part of HVAC system 10, but they are not limited to HVAC system 10 and may be practiced with other systems as well. While HVAC systems are used here as an example, it is contemplated that the methods disclosed herein may be applied to other devices, such as water heaters and other devices.

The illustrative HVAC system 10 of FIG. 1 includes an HVAC controller 12, which may be or include a thermostat in some instances. The HVAC controller may be configured to interact with and control HVAC equipment 14. HVAC controller 12 may be a local HVAC controller, located in the building that is conditioned by the HVAC equipment 14, or in close proximity to the building, such as within a complex of neighboring buildings. HVAC equipment 14 may include, for example, one or more of cooling unit 16, heating unit 18 and/or ventilation unit 20. HVAC equipment 14 may include other units such as a humidifier unit, a dehumidifier unit, a UV filter unit and/or any other suitable HVAC unit as desired. In some cases, cooling unit 16 and heating unit 18 may, for example, be combined in a forced air system, or perhaps a heat pump system, particularly in residential and/or light commercial applications. In other cases, one or more of cooling unit 16, heating unit 18 and/or ventilation unit 20 may be distinct systems controlled, either directly or indirectly, by HVAC controller 12. In some instances, it is contemplated that HVAC controller 12 may represent two or more distinct controllers, each controlling different equipment within HVAC equipment 14, and/or different zones within a structure.

HVAC controller 12 may include any suitable components related to effecting control of the HVAC system 10. For example, HVAC controller 12 may include a user interface 32. The user interface 32 may include one or more displays and/or buttons that a user may interact with. In some instances, a touchscreen display may be provided. In the illustrative embodiment, HVAC controller 12 includes a processor 34, which may be a microprocessor, and a memory 36 which may be used to store any appropriate information such as HVAC control routines or code, historical performance data, HVAC system parameters, one or more programmable schedules for changing HVAC system parameters over time, a utility pricing schedule that includes one or more enhanced pricing time periods, and so on. HVAC system parameters may include setpoints for heating, cooling, humidity, etc., modes for ventilation equipment, fan settings, and the like.

As shown, HVAC controller 12 may include one or more sensors, such as an internal sensor 38 located within a housing 42 of the HVAC controller 12, and/or external sensors 40, which may be located external to the controller housing 42. The external sensors 40 may be 1within the building and/or outside the building, as desired. HVAC controller 12 may include one or more outputs 44 configured to issue operation commands to HVAC equipment 14 including units 16, 18, 20. It is contemplated that HVAC controller 10 may be configured to execute any method of the present disclosure.

One or more utilities 22 may provide energy to the HVAC system 10, including HVAC equipment 14. The utility or utilities 22 may supply a source of energy such as electricity, natural gas, hot water, steam, and/or any other suitable sources of energy. In order to help reduce peak loads, utilities are increasingly employing variable pricing schemes. Any number of pricing (rate) schemes may be employed. For example, energy rates may be raised during an enhanced pricing time period during the day compared to at night, due to higher anticipated demand for industrial and commercial use and/or greater demand for cooling during daylight hours. Any appropriate number of rate changes may be made during a day, such as a mid-tier or mid-peak rate becoming effective at the start of the work day, then a higher-tier or higher-peak rate becoming effective for the greatest temperature period later in the day when air conditioning loads are usually highest, then returning to a non-peak rate after the work day ends. In some arrangements, enhanced pricing time periods may recur on a daily basis, or they may recur daily within a group of days such as weekdays, with different rate schedules being effective on other groups of days such as weekends. In some cases, enhanced pricing time periods of a utility may recur on a weekly basis.

Schedules for recurrences of enhanced pricing time periods may vary over longer time intervals, such as between seasons. For example, a summer schedule for weekly recurrences of enhanced pricing time periods may be in force during warmer months of the year, and a different winter schedule may be in effect for colder months.

In some instances, utilities may plan and communicate schedules for rate/price changes well in advance of the dates for such changes. For example, summer and winter enhanced pricing rate schedules may be determined long before the in-force dates for the schedules. In other situations, enhanced pricing time periods may be declared and/or scheduled on shorter time scales, such as in response to a heat wave or a cold snap (periods of relatively extreme environmental temperatures), or even due to an unforeseen cause such as failure of a power generation facility or an international crisis that constrains energy supplies. In some situations, a utility may enact an enhanced pricing time period of Critical Peak Pricing (CPP) with short notice (for example announcing a CPP event one day in advance or less), for example in response to actual or anticipated very high demand for energy.

In response to higher rates during such enhanced pricing time periods, customers may desire to curtail energy consumption (and hence, demand on the utility) relative to consumption during periods of normal or nominal pricing. This may be accomplished by, for example, temporarily setting less comfortable setpoints. Generally speaking, a demand-side response to enhanced pricing may be achieved in any number of ways. A homeowner with a simple non-programmable thermostat may manually adjust the thermostat setpoint in response to rate changes. This approach may be relatively labor intensive and require substantial diligence on the part of the homeowner. In a more sophisticated approach, a local HVAC controller such as a thermostat may be configured to receive automated signals from a utility (such as via a wired and/or radio-frequency communication link) that communicate enhanced pricing information, and the HVAC controller may be configured to adjust HVAC system operation in a predetermined response to price changes without the need for immediate user action and/or awareness. Aspects of such a system are disclosed in, for example, U.S. Pat. No. 6,574, 581, "PROFILE BASED METHOD FOR DERIVING A TEMPERATURE SETPOINT USING A 'DELTA' BASED ON CROSS-INDEXING A RECEIVED PRICE-POINT LEVEL SIGNAL," Bohrer, et al., which is hereby incorporated by reference in its entirety.

Other approaches to responding to variable pricing schemes having scheduled enhanced pricing time periods provide methods and devices that assist utility customers in modifying HVAC system operation and energy consumption in view of rates changes of utilities during enhanced pricing time periods, without necessarily requiring an automated communication link between a utility and the HVAC system controller. In some instances, manual entry of pricing schedule information into an HVAC controller may be performed by a utility customer such as a homeowner. Aspects of such systems are disclosed in, for example, U.S. patent application Ser. No. 12/692,334, "HVAC CONTROL WITH UTILITY TIME OF DAY PRICING SUPPORT," Amundson, et al., filed Jan. 22, 2010, which is hereby incorporated by reference in its entirety.

In some illustrative embodiments of the present disclosure, HVAC controller 12 may store in memory 36 a utility pricing schedule that includes one or more enhanced pricing time periods including at least one scheduled price change of a utility. The utility pricing schedule may be entered into the controller's memory 36 by any suitable method. The utility pricing schedule may be entered, for example, by manual input via the user interface 32, but this is not required. Other possible methods for entering a utility pricing schedule into memory 36 include transfer via a wired or wireless communications protocol or via a flash memory device, for example.

Methods of the present disclosure may be described in relation to an HVAC system operating during a heating season, but it is contemplated that analogous considerations may apply to HVAC system operation during other seasons, such as cooling seasons, as well.

Figure 2:
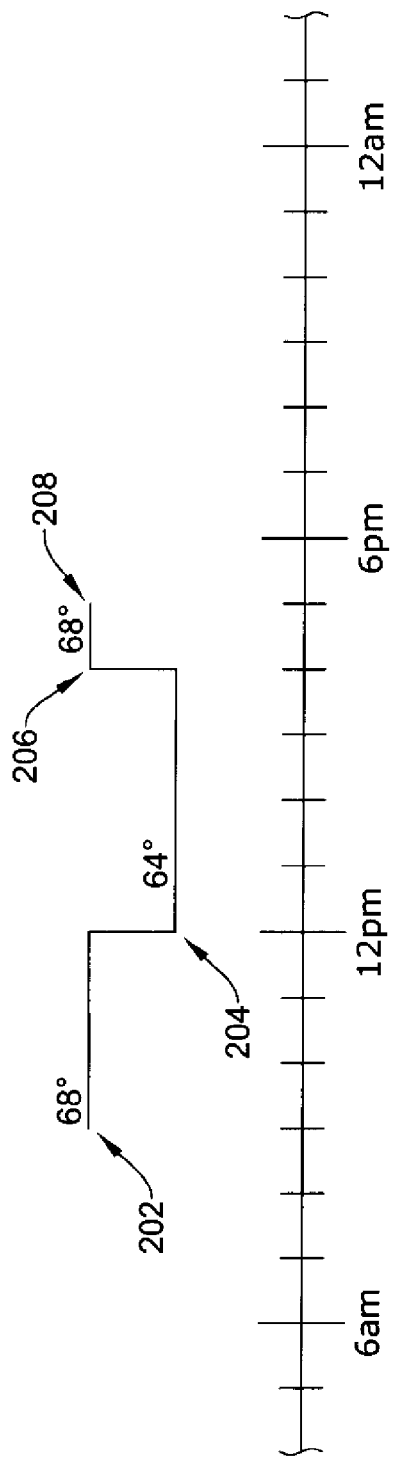
FIG. 2 is a time line illustrating an exemplary utility pricing schedule during a portion of one day.

FIG. 2 is a time line illustrating an exemplary utility pricing schedule during a portion of one day. Before 9:00 am and after 5:00 pm, nominal utility pricing may be in effect. At 9:00 am, a scheduled price change of the utility pricing schedule takes place as indicated at 202. This scheduled price change may correspond to the start of an enhanced pricing time period. Each schedule price change of a utility may be associated with a utility price level, such as Off-Peak, Mid-Peak, High-Peak, etc., such that each enhanced pricing time period may have an associated or corresponding enhanced utility price level (and non-enhanced pricing time periods may correspond to, for example, an Off-Peak utility price level). Furthermore, at least one utility price level setpoint may be entered, defined, or otherwise set to associate with or correspond to each of the utility price levels. For example, a heating utility price level setpoint of 68° F. may be entered and associated with Mid-Peak or Mid-tier pricing, as illustrated in FIG. 2 for the enhanced pricing time period starting at 202. More than one utility price level setpoint may be associated with a single utility price level. For example, a cooling utility price level setpoint of 85° F. may also be associated with Mid-peak pricing. Other utility price levels may have different utility price level setpoints. A High-Peak utility price level, for example, may have associated utility price level setpoints of 64° F. (heating) at shown at 204 and 90° F. (cooling).

Each enhanced pricing time period may have at least one associated enhanced pricing time period setpoint, and may have multiple setpoints, for example to correspond to heating and cooling seasons or modes of operation. Enhanced pricing time period setpoints may be associated with enhanced pricing time period in any suitable way. As discussed herein, in some illustrative embodiments an enhanced pricing time period may be associated with a utility price level, which in turn may be associated with at least one utility price level setpoint, and hence, the enhanced pricing time period may be transitively associated with at least one utility price level setpoint. In some illustrative embodiments, enhanced pricing time period setpoints may be associated with enhanced pricing time periods directly, for example, without necessarily associating either with a utility price level. Such associations may be made by user input through a user interface of an HVAC controller, or by any other suitable method. In some illustrative embodiments, enhanced pricing time period setpoints may be generated or otherwise determined as offsets from setpoints of another schedule such as a nominal programmable schedule.

Enhanced pricing time period setpoints may, in some situations, represent setpoints that an HVAC controller will attempt to maintain, but not necessarily in all situations. Enhanced pricing time period setpoints may sometimes be regarded as enhanced pricing time period setpoint limits in that they may demark a limit to a range of setpoints to which an HVAC may control. For example, during an enhanced pricing time period, a controller may be configured to compare a nominal setpoint (i.e., a setpoint to which it would attempt to control without regard to energy saving considerations) with an applicable enhanced pricing time period setpoint. During an enhanced pricing time period in the heating season, a nominal setpoint may be 70° F. while the enhanced pricing time period setpoint may be 68° F. In this case, the HVAC controller may select the utility price level setpoint of 68° F. as being more economical, and control to that setpoint. At a different time, during an enhanced pricing time period when the enhanced pricing time period setpoint is still 68° F., but the nominal setpoint is 64° F., the HVAC controller may select the nominal setpoint of 64° F. as being more economical.

Referring back to FIG. 2, another scheduled price change takes place at 12:00 pm as indicated at 204, marking the end of the enhanced pricing time period that started at 9:00 am and the beginning of another enhanced pricing time period. This may be a High-tier or High-Peak enhanced pricing time period in the example shown, with a heating utility price level setpoint of 64° F. (due to higher utility rates in effect during this enhanced pricing time period, an end user may set the more restrictive, more-economical limit of 64° F., as compared with the Mid-tier utility price level setpoint of 68° F.). At 4:00 pm, this High-Peak enhanced pricing time period may end, as indicated at 206, and another Mid-Peak enhanced pricing time period may start, ending then at 5:00 pm (208).

In some illustrative embodiments, the HVAC controller 12 may maintain in its memory a nominal schedule that may be used to control the HVAC system during non-enhanced pricing periods. The nominal schedule may be similar to that shown and described below with respect to FIG. 3. As discussed further herein, setpoints of the nominal schedule may also be used to control the HVAC system during enhanced pricing periods, such as when they are more economical than enhanced pricing time period setpoints.

Figure 3:
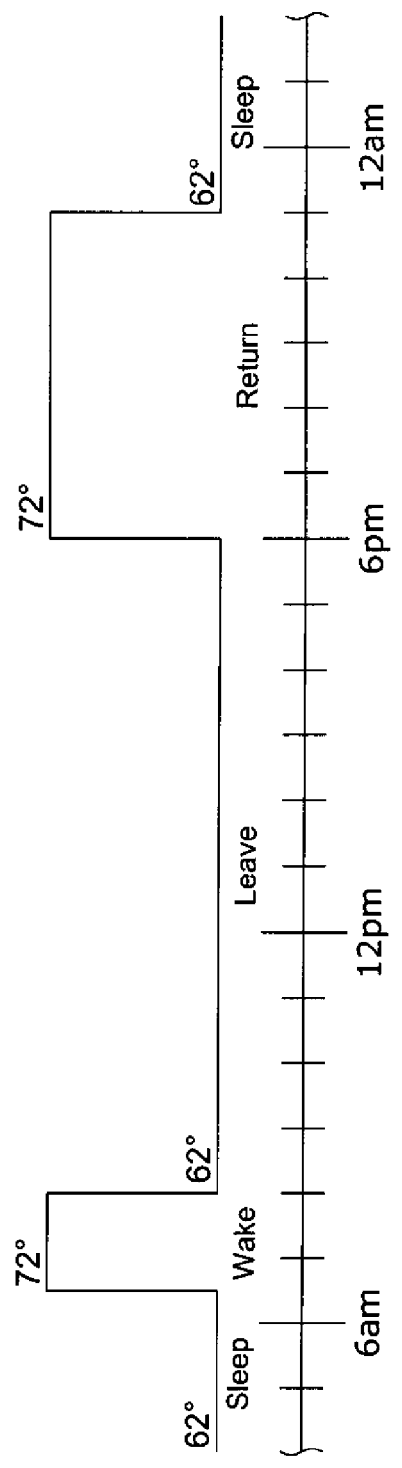
FIG. 3 is a time line illustrating an exemplary nominal schedule during a portion of one day.

The nominal schedule may represent the normal programmable schedule of a programmable thermostat. The nominal schedule may, for example, be a 7 day programmable schedule (where each of the seven days of the week can have a separate schedule), a 5-2 programmable schedule (where the five week days have a common schedule, and the two weekend days have a common schedule), or any other schedule. In some cases, the nominal schedule may have a number of days and one or more time periods for each of at least some of the days. In some instances, the nominal schedule may include a "sleep," a "wake," a "leave," and a "return" time period for each of the days of a week. The nominal schedule may have at least one setpoint associated with each of the one or more time periods. The nominal schedule may be maintained in the local HVAC controller's memory, and typically may be modified by an end user. The nominal schedule may be programmed using an interface such as one of those disclosed in U.S. Pat. No. 7,114,554, "CONTROLLER INTERFACE WITH MULTIPLE DAY PROGRAMMING," Bergman et al., which is hereby incorporated by reference in its entirety. FIG. 3 is a time line illustrating an exemplary nominal schedule during a portion of one day. In the example shown, a "sleep" time period with a nominal setpoint of 62° F. ends at 6:30 am and is followed immediately by a "wake" time period with a nominal setpoint of 72° F. from 6:30 am to 8:00 am. A "leave" time period extends from 8:00 am to 6:00 pm, during which the nominal setpoint is 62° F. A "return" time period commences at 6:00 pm, during which a 72° F. nominal setpoint is in effect until the period ends coincident with the start of the next "sleep" time period.

The lower nominal setpoints of 62° F. in effect during the "sleep" and "leave" time periods may be considered to be energy efficient setpoints, as they generally may be maintained with less energy usage than higher setpoints during a heating season. Conversely, the nominal setpoints of 72° F. in effect during the "wake" and "return" time periods may be considered to be less energy efficient setpoints, or comfort setpoints.

As noted elsewhere, it is not physically possible to instantaneously transition to a comfort setpoint temperature from a prior more economical temperature, and hence, an HVAC controller may actuate one or more HVAC units such as a furnace or air conditioner in advance of a target time (e.g., in advance of the 6:30 am "wake" period in the nominal schedule of FIG. 3) to reach the target temperature at about the target time (e.g., the comfort temperature of 72° F. at 6:30 am). A number of methods exist for such recovery processes. It may be considered desirable to achieve a target temperature at as close to a target time as possible, but a conservative approach that starts recovery relatively early to ensure that the target temperature is always achieved on time may waste energy compared to a recovery strategy that attempts to reach the target temperature just-in-time, but is occasionally late in achieving it. A number of "adaptive" and "adaptive intelligent" recovery methods have been developed that attempt to optimize the recovery process, and in general, any such compatible methods may be practiced in conjunction with the methods and devices disclosed herein. The present disclosure provides methods and devices for setpoint recovery that may take into account a utility pricing schedule to modify energy usage during enhanced pricing time periods, potentially reducing energy consumption during higher rate periods.

Figure 4:
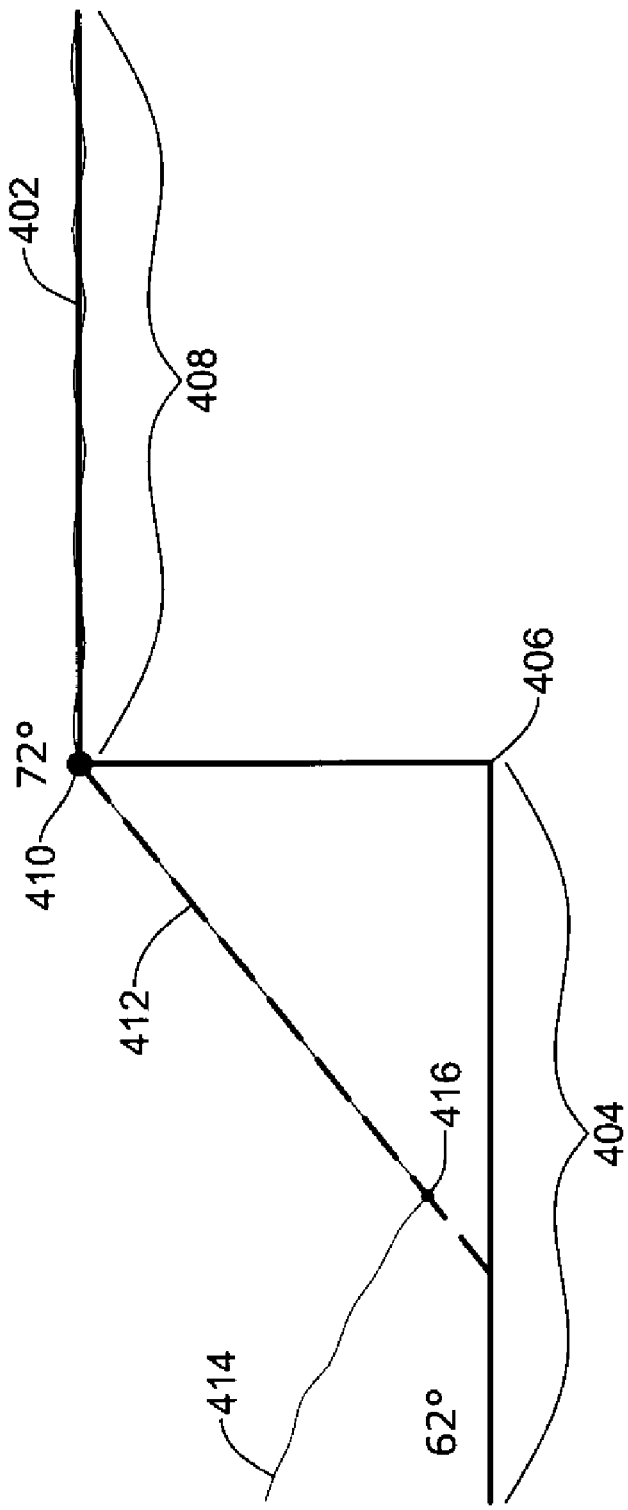
FIG. 4 is a time line that schematically illustrates a setpoint recovery process.

FIG. 4 is a time line that schematically illustrates a setpoint recovery during a heating season. Line 402 represents a heating setpoint of a nominal schedule which may be a programmable schedule. On the left, a lower, more energy efficient setpoint (for example, 62° F., but this is of course only exemplary) is effective during a first period of time 404. At 406, the heating setpoint of the nominal schedule changes to a higher, less energy efficient setpoint (for example, 72° F.), effective during a second period of time 408. The dot at 410 represents a nominal target setpoint (the less energy efficient setpoint) at a nominal target time (the time of the transition from the energy efficient setpoint to the less energy efficient setpoint). Recovery ramp 412 represents an estimate of the temperature vs. time that an HVAC system such as HVAC system 10 of FIG. 1 may be able to achieve in attempting to recover from the lower temperature to the target setpoint by the beginning of time period 408. While shown here as a straight line for ease of illustration, a recovery ramp may more generally take the form of a curve, and any suitable model may be used for estimating or projecting recovery ramps by methods and devices of the present disclosure. In some instances, the recovery ramp 412 may factor in historical HVAC system performance, measurements of current environmental conditions including inside and/or outside temperatures, measured and/or estimated heat loads in or on a space to be controlled, etc. Trace 414 represents the actual temperature of inside air of a building to be controlled. Trace 414 decays downward in temperature over time as the building loses heat to the environment during the first period of time 404, which may be, for example, an unoccupied "leave" period of a house. When the trace 414 intersects the recovery ramp 412 at 416, an HVAC unit such as a furnace, boiler, heat pump, etc., may be activated to initiate recovery, and the air temperature of the building may progress up the recovery ramp (approximately) toward the target setpoint 410. In effect, when initiating recovery at recovery start time 416, an HVAC controller may switch to an operational setpoint having the value of the less energy efficient setpoint of the second time period 408. In some cases, an HVAC controller may vary an operational setpoint multiple times over a time to attempt to drive setpoint recovery along a recovery ramp.

We now consider setpoint recovery in the context of utility pricing schedules and enhanced pricing time periods. If an enhanced pricing time period is in effect when recovery is initiated at 416, then setpoint recovery will entail greater consumption of energy during the enhanced pricing time period, at least compared to an alternative of not initiating recovery at 416 and continuing to control the HVAC system in accordance with the energy efficient setpoint. This alternative may be practiced, for example, by controlling an HVAC system without regard to setpoint recovery, and only setting the operating setpoint of an HVAC controller according to a nominal programmable schedule such as that illustrated in FIG. 3. That is, in one instance, the HVAC controller may control the HVAC system with an operational setpoint having the value of the nominal setpoint, rather than initiating recovery during an enhanced pricing time period (i.e. recovery is disabled).

Figure 5:
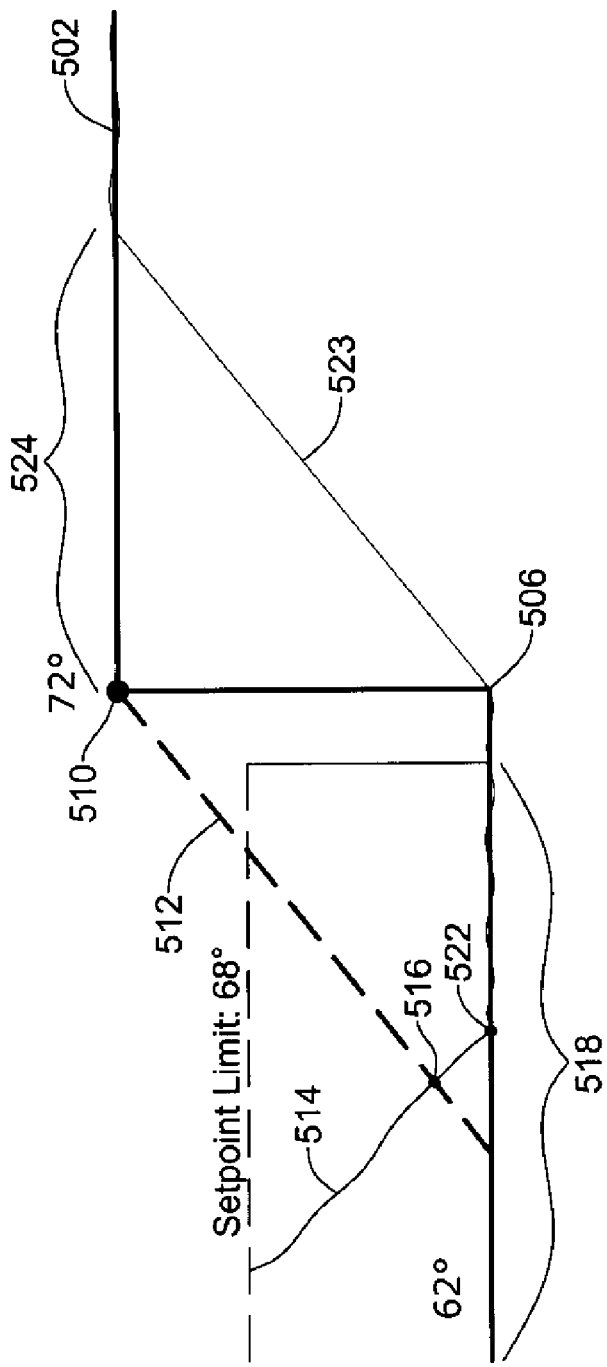
FIG. 5 is a time line that schematically illustrates a setpoint change of a nominal schedule with recovery disabled.

FIG. 5 is a time line that schematically illustrates a setpoint change of a nominal schedule with recovery disabled. Line 502 represents the heating setpoint of a nominal schedule essentially the same as line 402 of FIG. 4. In the scenario of FIG. 5, an enhanced pricing time period 518 is in effect and an enhanced pricing time period setpoint, or setpoint limit, of 68° F., has been programmed into an HVAC controller. Trace 514 represent inside air temperature that decays over time and crosses (at 516) the calculated recovery ramp 512, which may be considered a nominal recovery ramp for recovery to a nominal target setpoint at a nominal target time (at point 510). The time at 516 may be considered the nominal recovery start time, which may be defined as the time at which one or more HVAC units would need to be activated to move the temperature of the inside air to achieve the less energy efficient setpoint at about the beginning 506 of the second period of time 502 (i.e., achieve the nominal target setpoint at the nominal target time at 510). In this scenario, however, recovery may be disabled and consequently no recovery is initiated at point 516, and the temperature continues its decay until reaching the energy efficient setpoint at 522. The HVAC controller maintains the temperature at about the energy efficient setpoint until the second period of time commences at 506, whereupon the operational setpoint is set to the less energy efficient setpoint, and the actual recovery commences, represented by the rise of the inside air temperature up actual recovery ramp 523. In this scenario, the energy consumed during the enhanced pricing time period 518 may be substantially decreased (compared to the scenario of FIG. 4) at the cost of delaying the return to the less efficient setpoint by a time interval 524 following the beginning 506 of the second time period.

Reduced energy consumption during enhanced pricing time periods also may be achieved with HVAC control methods that move the inside air temperature to the less energy efficient setpoint but with less delay than in the method illustrated in FIG. 5, in which recovery commencing before the start of the second period of time is suppressed. FIGS. 6 through 10 schematically illustrate illustrative methods of operating HVAC systems that may balance more timely setpoint recovery with energy savings during enhanced pricing time periods.

Figure 6:
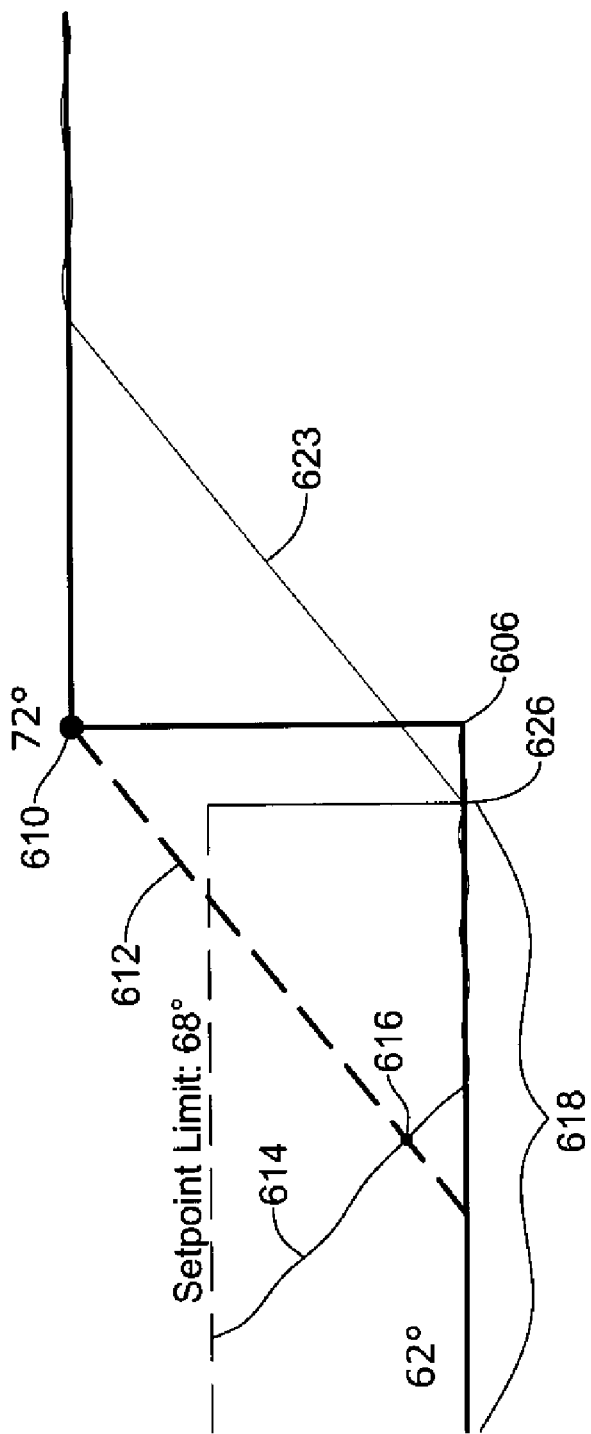
FIG. 6 is a time line that schematically illustrates an illustrative method of operating an HVAC system that may advance setpoint recovery while achieving energy savings during an enhanced pricing time period.

FIG. 6 is a time line that schematically illustrates an illustrative method of operating an HVAC system that may advance setpoint recovery while achieving energy savings during an enhanced pricing time period. The scenario illustrated in FIG. 6 shares similarities with that of FIG. 5, but differs in that one or more of HVAC units may be started at an actual recovery start time before the beginning of the second period of time (which commences at 606) such that the temperature of the inside air begins moving from its current temperature toward the less energy efficient setpoint 610 before the beginning of the second period of time. As illustrated in FIG. 6, the inside air temperature is shown decaying on trace 614 and eventually crosses the nominal recovery ramp 612 at the nominal recovery start time 616. As can be seen, there is an enhanced pricing time period scheduled and in effect between the nominal recovery start time 616 and the beginning 606 of the second time period. The enhanced pricing time period is scheduled to end before the beginning of the second period of time, but this is not required. In this illustrative method, the actual recovery start time is set at about the end 626 of the first enhanced pricing time period 618, at which time the rise of inside air temperature up the actual recovery ramp 623 begins. By waiting to start recovery until after the enhanced pricing time period 618 ends, energy consumption during the enhanced pricing time period 618 is reduced compared to a case in which recovery is started at the nominal recovery start time 616. Compared to the method illustrated in FIG. 5, however, recovery to the less energy efficient setpoint 610 may be achieved earlier due to the earlier actual recovery start time at 626.

Figure 7:
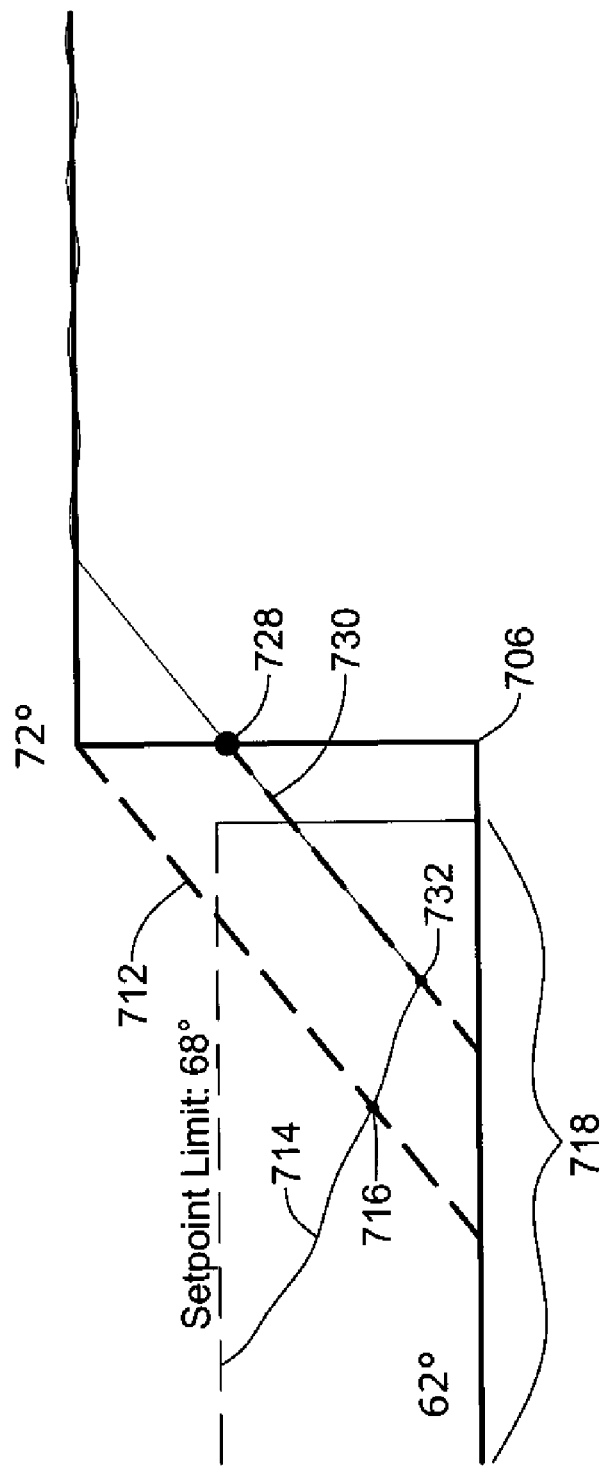
FIG. 7 is a time line that schematically illustrates another illustrative method of operating an HVAC system that may advance setpoint recovery while achieving energy savings during an enhanced pricing time period.

FIG. 7 is a time line that schematically illustrates another illustrative method of operating an HVAC system that may advance setpoint recovery while achieving energy savings during an enhanced pricing time period. Similarly to the examples of FIGS. 4-6, in the scenario illustrated in FIG. 7, the inside air temperature is shown decaying on trace 714, and eventually crosses the nominal recovery ramp 712 at a nominal recovery start time 716. There is an enhanced pricing time period 718 scheduled and in effect between the nominal recovery start time 716 and the beginning 706 of the second period of time. The enhanced pricing time period 718 is scheduled to end before the beginning of the second period of time, but this is not required. In this illustrative method, the actual recovery start time may be set such that the temperature of the inside air will reach the enhanced pricing time period setpoint at about the beginning 706 of the second period of time. In some illustrative embodiments, a recovery target 728 may be set with a recovery target setpoint set as the enhanced pricing time period setpoint in effect at the nominal recovery start time 716, and a corresponding recovery target time set as the nominal target time, that is, the beginning 706 of the second period of time. In some illustrative embodiments where more than one enhanced pricing time period may be in effect between the nominal recovery start time 716 and the beginning 706 of the second period of time, a most restrictive of the enhanced pricing time period setpoints may be selected to be the recovery target setpoint. Once a recovery target 728 is set, a recovery ramp 730 may be determined (e.g. calculated) relative to the recovery target at 728. When the air temperature on trace 714 intercepts the recovery ramp 730 at 732, an actual recovery may commence and the recovery start time may be set at 732 such that the temperature of the inside air will reach the enhanced pricing time period setpoint at about the beginning 706 of the second period of time. In this illustrative method, recovery to the less energy efficient setpoint may be achieved more promptly than in the methods illustrated in FIG. 5 or 6, while still reducing energy consumption during the enhanced pricing time period 718 compared to a nominal recovery method that disregards a utility pricing schedule.

Figure 8:
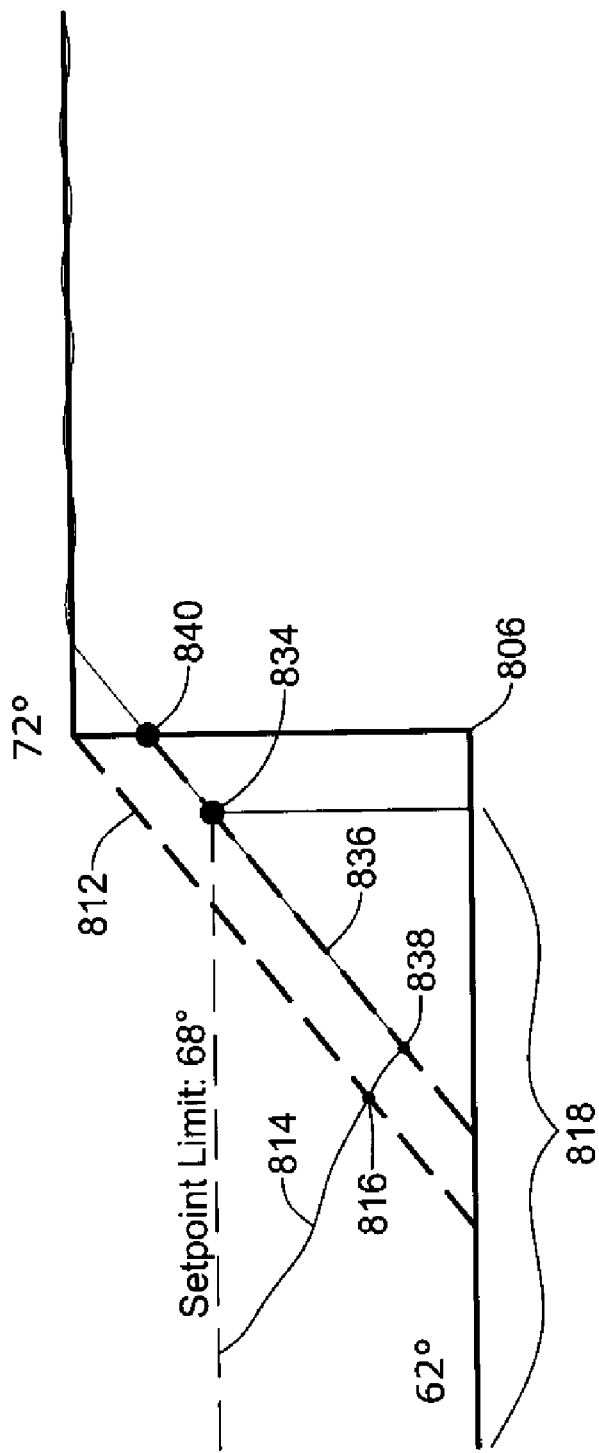
FIG. 8 is a time line that schematically illustrates another illustrative method of operating an HVAC system that may advance setpoint recovery while achieving energy savings during an enhanced pricing time period.

FIG. 8 is a time line that schematically illustrates another illustrative method of operating an HVAC system that may advance setpoint recovery while achieving energy savings during an enhanced pricing time period. Similarly to the examples of FIGS. 4-7, in the scenario illustrated in FIG. 8, the inside air temperature is shown decaying on trace 814, and eventually crosses the nominal recovery ramp 812 at a nominal recovery start time 816. There is an enhanced pricing time period 818 scheduled and in effect between the nominal recovery start time 816 and the beginning 806 of the second period of time. The enhanced pricing time period 818 is scheduled to end before the beginning of the second period of time, but this is not required. In this illustrative method, the recovery start time is set such that one or more of the HVAC units are activated to attempt to move the temperature of the inside air to reach the enhanced pricing time period setpoint at about the end of the enhanced pricing time period 818. In some illustrative embodiments, a recovery target 834 may be set with a recovery target setpoint set as the enhanced pricing time period setpoint in effect at the nominal recovery start time, and a corresponding recovery target time may be set at the end of the enhanced pricing time period 818. In some illustrative embodiments, where more than one enhanced pricing time period may be in effect between the nominal recovery start time 816 and the beginning 806 of the second period of time, a most restrictive of the enhanced pricing time period setpoints may be selected to be the recovery target setpoint, and the actual recovery target time may be set at the end of the corresponding enhanced pricing time period, or the end of the last enhanced pricing time period preceding the beginning 806 of the second period of time. Once a recovery target 834 is set, a recovery ramp 836 may be determined (e.g. calculated) relative to the recovery target 834. When the air temperature on trace 814 intercepts the recovery ramp 836 at 838, actual recovery may commence and the recovery start time may be set at 838 such that the temperature of the inside air will be raised by HVAC units in an attempt to reach the enhanced pricing time period setpoint at about the end of the enhanced pricing time period 818. After the end of the enhanced pricing time period 818, an operational setpoint may be set to the less energy efficient setpoint of the second period of time, and recovery may proceed toward that setpoint. In this method, recovery to the less energy efficient setpoint may be achieved more promptly than in the methods illustrated in FIGS. 5-7 while still reducing energy consumption during the enhanced pricing time period 818 compared to a nominal recovery method that disregards a utility pricing schedule.

In a variation of the method detailed in relation to FIG. 8, recovery may be projected forward from 834 to the beginning 806 of the second period of time, and a recovery target setpoint may be set at the projected recovery temperature at time 806. This target, marked by dot 840, may alternatively used as a recovery target.

Figure 9:
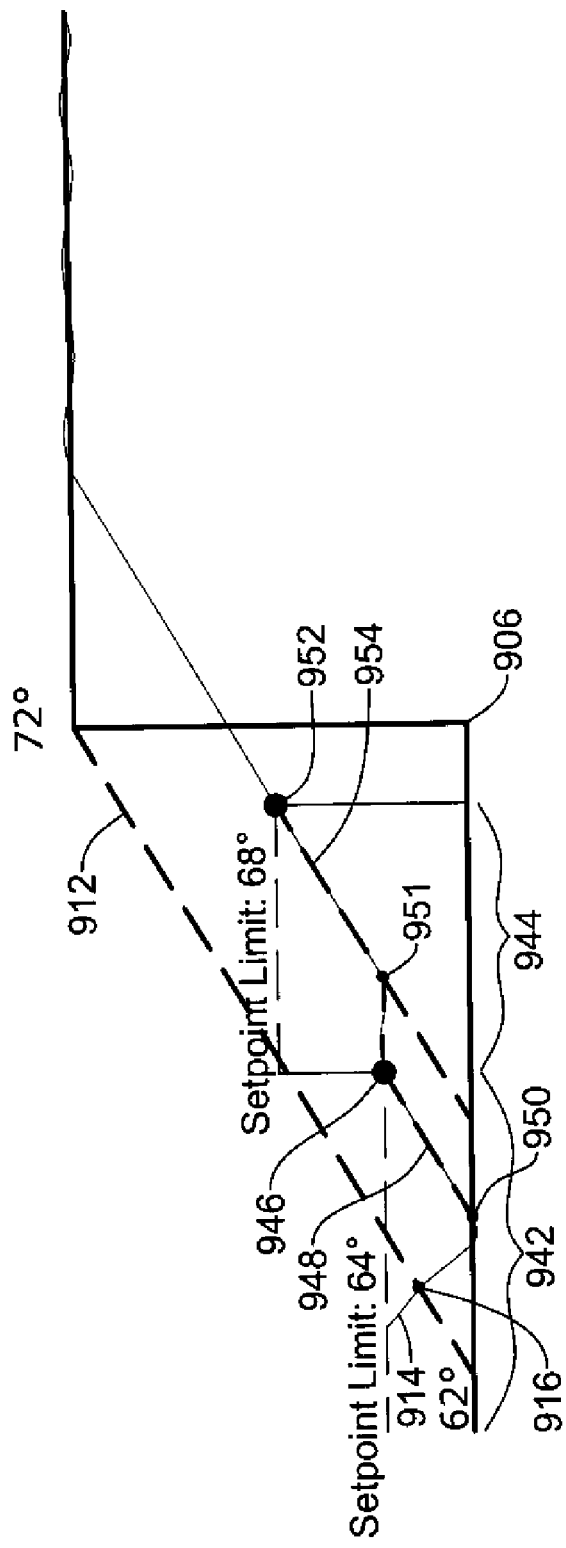
FIG. 9 is a time line that schematically illustrates another illustrative method of operating an HVAC system that may advance setpoint recovery while achieving energy savings during an enhanced pricing time period.

FIG. 9 is a time line that schematically illustrates another illustrative method of operating an HVAC system that may advance setpoint recovery while achieving energy savings during an enhanced pricing time period. Similarly to the examples of FIGS. 4-8, in the scenario illustrated in FIG. 9, the inside air temperature is shown decaying along trace 914, and eventually crosses the nominal recovery ramp 912 at a nominal recovery start time 916. In this scenario, there are multiple enhanced pricing time periods 942 and 944 scheduled and in effect between the nominal recovery start time 916 and the beginning 906 of the second period of time. The last enhanced pricing time period 944 is scheduled to end at or before the beginning of the second period of time, but this is not required. In this illustrative method, the actual recovery start time is set such that one or more of the HVAC units are activated to attempt to move the temperature of the inside air to reach the first enhanced pricing time period setpoint at about the end of the first enhanced pricing time period. In some illustrative embodiments, a first recovery target 946 may be set with a first recovery target setpoint set as the first enhanced pricing time period setpoint, and a corresponding first recovery target time may be set at the end of the first enhanced pricing time period. Once this first recovery target 946 is set, a first recovery ramp 948 may be determined (e.g. calculated) relative to the first recovery target at 946. When the air temperature on trace 914 intercepts the first recovery ramp 948 at 950, recovery may commence and the recovery start time may be set at 950 such that the temperature of the inside air will be raised by HVAC units in an attempt to reach the first recovery target at 946. Upon entering the second enhanced pricing time period 944, an operational setpoint may be clipped at the first enhanced pricing time period setpoint if the first enhanced pricing time period setpoint is more energy efficient than the second enhanced pricing time period setpoint, until a recovery resumption time 951. In some illustrative embodiments, where the first enhanced pricing time period setpoint is less energy efficient than the second enhanced pricing time period setpoint, the operational setpoint may be set to the second enhanced pricing time period setpoint until a recovery resumption time 951. In addition to the first recovery target, a second recovery target 952 may be set with a second recovery target setpoint set as the second enhanced pricing time period setpoint, and a second recovery target time set at the end of the second enhanced pricing time period. Once this second recovery target 952 is set, a second recovery ramp 954 may be determined relative to the second recovery target. When the air temperature on trace 914 intercepts the second recovery ramp 954 at 951, recovery may resume and the recovery resumption time may be set at 951 such that the temperature of the inside air will be raised by HVAC units in an attempt to reach the second recovery target at 952. After the end of the second enhanced pricing time period 944, an operational setpoint may be set to the less efficient setpoint of the second period of time and recovery may proceed toward that setpoint. This method may be extended as well to scenarios with more than two enhanced pricing time periods between a nominal recovery start time and the start of the second period of time. In this method, recovery to the less efficient set point may be achieved more promptly than in some other methods while still reducing energy consumption during the enhanced pricing time periods compared to a nominal recovery method that disregards a utility pricing schedule.

Figure 10:
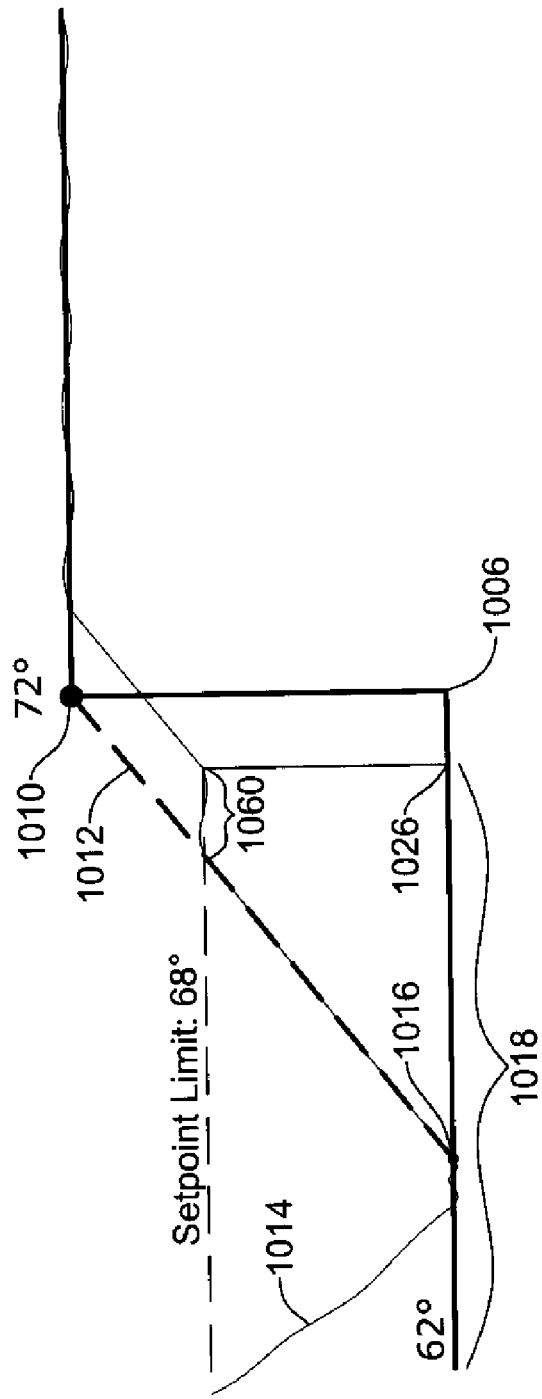
FIG. 10 is a time line that schematically illustrates another illustrative method of operating an HVAC system that may advance setpoint recovery while achieving energy savings during an enhanced pricing time period.

FIG. 10 is a time line that schematically illustrates another illustrative method of operating an HVAC system that may advance setpoint recovery while achieving energy savings during an enhanced pricing time period. The scenario illustrated in FIG. 10 shares some similarities with that of FIG. 4. A nominal target at 1010 having a nominal target setpoint (the less energy efficient setpoint of the second period of time) at a nominal target time (the beginning of the second period of time at 1006) may also be considered a recovery target with the same recovery target setpoint and recovery target time. A nominal recovery start time 1016, when the inside air temperature moving along trace 1014 intersects the nominal recovery ramp 1012, may be used as the actual recovery start time. In contrast with the scenario illustrated in FIG. 4, where setpoint recovery was practiced without regard to energy savings during enhanced pricing time periods, in the illustrative method of FIG. 10, during each enhanced pricing time period 1018 having an associated enhanced pricing time period setpoint active between the recovery start time and the beginning of the second period of time, an operational setpoint is clipped at the associated enhanced pricing time period setpoint during setpoint recovery. This is illustrated in FIG. 10 during the interval 1060, which ends at time 1026. In this method, recovery to the less energy efficient set point may be achieved more promptly than in some other methods while still reducing energy consumption during the enhanced pricing time period 1018 compared to a nominal recovery method that disregards a utility pricing schedule.

In some illustrative embodiments of the present disclosure, methods of controlling an HVAC system may include establishing an enhanced pricing recovery schedule based at least in part upon a nominal target setpoint and a nominal target time of a programmable schedule and a utility pricing schedule, and controlling one or more HVAC units of the HVAC system in accordance with the enhanced pricing recovery schedule. Establishing an enhanced pricing recovery schedule may include setting recovery targets, determining recovery ramps, determining recovery start times, etc., as described in the discussions of the methods of FIGS. 6-10, for example.

In some illustrative embodiments of the present disclosure, methods of controlling an HVAC system may include enabling recovery during enhanced pricing time periods whose corresponding utility price levels do not exceed utility price levels of subsequent enhanced pricing time periods preceding the nominal target time, and/or disabling recovery during enhanced pricing time periods whose corresponding utility price levels exceed utility price levels of subsequent enhanced pricing time periods preceding the nominal target time.

In some illustrative embodiments of the present disclosure, methods of controlling an HVAC system may include accepting a selection of preference for economy or comfort, and establishing an enhanced pricing recovery schedule based at least in part upon the preference selection. For example, a selection of economy may result in establishing an enhanced pricing recovery schedule in accordance with the method discussed in connection with FIG. 6. A selection of comfort may result in establishing an enhanced pricing recovery schedule in accordance with the method discussed in connection with FIG. 8, for example. Furthermore, a selection of economy vs. comfort may be made on a sliding scale, with differing control methods used depending on the selection.

In some illustrative embodiments of the present disclosure, methods of controlling an HVAC system may include identifying recovery opportunities based at least in part upon the nominal schedule, with each recovery opportunity having an associated nominal target setpoint corresponding to a nominal target time. Recovery opportunities may correspond to programmed returns to comfort setpoints from more energy efficient setpoints, for example, when transitioning from a "sleep" period to a "wake" period, and/or when transitioning from a "leave" period to a "return" period. For identified recovery opportunities, methods of the present disclosure may be used for determining recovery start times, establishing and/or modifying enhanced pricing recovery schedules, and otherwise operating the HVAC system to recover setpoints while possibly modifying recovery actions in consideration of enhanced pricing time periods of utility pricing schedules.

The disclosure should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A method for operating an HVAC system, the HVAC system having one or more HVAC units for conditioning inside air of a building, and an HVAC controller for controlling the one or more HVAC units, the HVAC controller having a programmable schedule, wherein the programmable schedule includes an energy efficient setpoint that is effective for a first period of time followed by a less energy efficient setpoint effective for a second period of time, the method comprising:
    storing in a memory of the HVAC controller a utility pricing schedule that includes one or more enhanced pricing time periods;
    activating one or more of the HVAC units at an actual recovery start time that is before the beginning of the second period of time such that a temperature of the inside air begins moving from a current inside air temperature toward the less energy efficient setpoint before the beginning of the second period of time; and
    wherein the actual recovery start time is dependent upon one or more enhanced pricing time periods that are scheduled between a nominal recovery start time and the beginning of the second time period, wherein the nominal recovery start time is defined as the time at which the one or more HVAC units would be activated to move the temperature of the inside air to achieve the less energy efficient setpoint at about the beginning of the second period of time.

2. The method of claim 1, wherein:
    when a first enhanced pricing time period is active at the nominal recovery start time and is scheduled to end before the beginning of the second period of time, the actual recovery start time is set at about the end of the first enhanced pricing time period.

3. The method of claim 1, wherein:
    when a first enhanced pricing time period is active at the nominal recovery start time and is scheduled to end at or before the beginning of the second period of time, and when the first enhanced pricing time period has an associated enhanced pricing time period setpoint, the actual recovery start time is set such that the temperature of the inside air will reach the enhanced pricing time period setpoint at about the beginning of the second period of time.

4. The method of claim 1, wherein:
    when a first enhanced pricing time period is active at the nominal recovery start time and is scheduled to end before the beginning of the second period of time, and when the first enhanced pricing time period has an associated enhanced pricing time period setpoint, the actual recovery start time is set such that the one or more of the HVAC units are activated to attempt to move the temperature of the inside air to the enhanced pricing time period setpoint at about the end of the first enhanced pricing time period.

5. The method of claim 1, wherein:
    the actual recovery start time is set at the nominal recovery start time, but during each enhanced pricing time period having an associated enhanced pricing time period setpoint active between the actual recovery start time and the beginning of the second period of time, the one or more of the HVAC units move the temperature of the inside air to the associated enhanced pricing time period setpoint.

6. The method of claim 1, wherein:
    when a first enhanced pricing time period is active at the nominal recovery start time and is scheduled to end before the beginning of the second period of time, and the first enhanced pricing time period has an associated first enhanced pricing time period setpoint; and
    when a second enhanced pricing time period is scheduled to be active following the first enhanced pricing time period and is scheduled to end at or before the beginning of the second period of time, and the second enhanced pricing time period has an associated second enhanced pricing time period setpoint that is less energy efficient than the first associated first enhanced pricing time period setpoint;
    the actual recovery start time is set such that the one or more of the HVAC units are activated to attempt to move the temperature of the inside space to the first enhanced pricing time period setpoint at about the end of the first enhanced pricing time period; and
    the one or more of the HVAC units controlling the temperature of the inside air to the first enhanced pricing time period setpoint during the second enhanced pricing time period until a recovery resumption time, the recovery resumption time being set such that the one or more of the HVAC units are activated to move the temperature of the inside space from at or near the first enhanced pricing time period setpoint to the second enhanced pricing time period setpoint at about the end of the second enhanced pricing time period.

7. A method for operating an HVAC system, the HVAC system having one or more utility-powered HVAC units for conditioning inside air of a building and a local HVAC controller for controlling the one or more HVAC units, wherein the HVAC controller includes a programmable schedule that includes a nominal target setpoint and a nominal target time, the method comprising:
    storing in the memory of the local HVAC controller a utility pricing schedule that corresponds to scheduled price changes of a utility, including one or more enhanced pricing time periods each having corresponding one or more enhanced pricing time period setpoints;
    establishing an enhanced pricing recovery schedule based at least in part upon the nominal target setpoint, the nominal target time and the utility pricing schedule; and
    controlling the one or more HVAC units with the local HVAC controller in accordance with the enhanced pricing recovery schedule.

8. The method of claim 7, wherein the enhanced pricing recovery schedule includes initiating a recovery from a current inside air temperature to the nominal setpoint only after an end time of a last enhanced pricing time period preceding the nominal target time.

9. The method of claim 7, wherein establishing the enhanced pricing recovery schedule includes establishing at least one recovery target setpoint corresponding to at least one recovery target time, and wherein the at least one recovery target setpoint is the nominal target setpoint and the at least one recovery target time is the nominal target time.

10. The method of claim 7, wherein establishing the enhanced pricing recovery schedule includes establishing at least one recovery target setpoint corresponding to at least one recovery target time, and wherein the at least one recovery target setpoint is an enhanced pricing time period setpoint and the at least one recovery target time is an end of a corresponding enhanced pricing time period.

11. The method of claim 7, wherein establishing the enhanced pricing recovery schedule includes establishing at least one recovery target setpoint corresponding to at least one recovery target time, and wherein the at least one recovery target setpoint is an enhanced pricing time period setpoint and the at least one recovery target time is the nominal target time.

12. The method of claim 7, wherein establishing the enhanced pricing recovery schedule includes establishing at least one recovery target setpoint corresponding to at least one recovery target time, and wherein the at least one recovery target setpoint is a most restrictive of one or more enhanced pricing time period setpoints corresponding to one or more enhanced pricing time periods in effect between a nominal recovery start time and the nominal target time; wherein the nominal recovery start time is defined as the time at which the one or more HVAC units would be activated to achieve the nominal target setpoint at about the nominal target time.

13. The method of claim 7, wherein each of the one or more enhanced pricing time periods has a corresponding utility price level, and wherein controlling the one or more HVAC units with the local HVAC controller in accordance with the enhanced pricing recovery schedule includes:
enabling recovery during those enhanced pricing time periods whose corresponding utility price levels do not exceed utility price levels of subsequent enhanced pricing time periods preceding the nominal target time; and
disabling recovery during those enhanced pricing time periods whose corresponding utility price levels exceed utility price levels of subsequent enhanced pricing time periods preceding the nominal target time.

14. The method of claim 7, further comprising the step of accepting a selection of preference for economy or comfort, and wherein establishing the enhanced pricing recovery schedule is based at least in part upon the preference selection.

15. An HVAC controller for controlling an HVAC system having one or more HVAC units for conditioning inside air of a building, the HVAC controller comprising:
a memory for storing a nominal schedule, the nominal schedule having a number of days and one or more time periods for each of at least some of the days, the nominal schedule further having at least one setpoint associated with each of the one or more time periods;
the memory also storing a utility pricing schedule that corresponds to scheduled price changes of a utility, including one or more enhanced pricing time periods each having corresponding one or more enhanced pricing time period setpoints;
a controller coupled to the memory for establishing or modifying an enhanced pricing setpoint recovery schedule based at least in part upon the nominal schedule and the utility pricing schedule; and
the controller configured to control the one or more HVAC units in accordance with the setpoint recovery schedule.

16. The HVAC controller of claim 15, wherein the controller is configured to:
identify recovery opportunities based at least in part upon the nominal schedule, each recovery opportunity having an associated nominal target setpoint corresponding to a nominal target time; and
determine an actual recovery start time for each of the recovery opportunities identified.

17. The HVAC controller of claim 16, wherein the actual recovery start time of at least one recovery opportunity is set after an end time of a last enhanced pricing time period preceding the nominal target time.

18. The HVAC controller of claim 16, wherein the actual recovery start time of at least one recovery opportunity is set before an end time of a last enhanced pricing time period preceding the nominal target time.

19. The HVAC controller of claim 16, wherein the actual recovery start time of at least one recovery opportunity is set such that a temperature of the inside space reaches a corresponding enhanced pricing time period setpoint at about an end time of a last enhanced pricing time period preceding the nominal target time.

20. The HVAC controller of claim 16, wherein the actual recovery start time of at least one recovery opportunity is set such that a temperature of the inside space reaches a corresponding enhanced pricing time period setpoint of a last enhanced pricing time period preceding the nominal target time at about the nominal target time.

* * * * *